United States Patent
Creeth et al.

(10) Patent No.: US 9,029,042 B2
(45) Date of Patent: *May 12, 2015

(54) REDOX FUEL CELL

(75) Inventors: Andrew Martin Creeth, Chester (GB); Andrew Robert Potter, Liverpool (GB); Kathryn Knuckey, Omskirk (GB)

(73) Assignee: Acal Energy Limited, Runcorn, Cheshire (GB)

( * ) Notice: Subject to any disclaimer, the term of this patent is extended or adjusted under 35 U.S.C. 154(b) by 1135 days.

This patent is subject to a terminal disclaimer.

(21) Appl. No.: 12/678,687

(22) PCT Filed: Sep. 24, 2008

(86) PCT No.: PCT/GB2008/050857
§ 371 (c)(1),
(2), (4) Date: Jul. 19, 2010

(87) PCT Pub. No.: WO2009/040577
PCT Pub. Date: Apr. 2, 2009

(65) Prior Publication Data
US 2010/0297522 A1    Nov. 25, 2010

(30) Foreign Application Priority Data

Sep. 24, 2007 (GB) .................................. 0718577.0

(51) Int. Cl.
*H01M 8/10* (2006.01)
*H01M 8/18* (2006.01)
*H01M 8/20* (2006.01)

(52) U.S. Cl.
CPC .............. *H01M 8/188* (2013.01); *Y02E 60/528* (2013.01)

(58) Field of Classification Search
USPC .............................................. 429/17, 19, 479
See application file for complete search history.

(56) References Cited

U.S. PATENT DOCUMENTS 3,152,013 A    10/1964    Juda
3,279,949 A    10/1966    Schaefer et al.
(Continued)

FOREIGN PATENT DOCUMENTS

EP    0 043 647    1/1982
EP    0 228 168    11/1986
(Continued)

OTHER PUBLICATIONS

S.R. Alley and W. Henderson, "Synthesis and characterization of ferrocenyl-phosphonic and -arsonic acids," J. Organomet. Chem., 637-639, 2001, 216-229.
(Continued)

*Primary Examiner* — Basia Ridley
*Assistant Examiner* — Caitlin Wilmot
(74) *Attorney, Agent, or Firm* — Knobbe Martens Olson & Bear LLP

(57) ABSTRACT

This invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing fluid communication with the cathode, the catholyte solution comprising a polyoxometallate redox couple being at least partially reduced at the cathode in operation of the cell, and at least partially re-generated by reaction with the oxidant after such reduction at the cathode, the catholyte solution comprising at least one counterion for the polyoxometallate redox couple wherein the at least one counterion comprises one or more divalent ions.

25 Claims, 2 Drawing Sheets

(56) References Cited

U.S. PATENT DOCUMENTS

| | | | |
|---|---|---|---|
| 3,294,588 A | 12/1966 | Beltzer et al. | |
| 3,360,401 A | 12/1967 | Grasselli et al. | |
| 3,540,933 A | 11/1970 | Boeke | |
| 3,607,420 A | 9/1971 | Cutler | |
| 4,048,383 A | 9/1977 | Clifford | |
| 4,396,687 A * | 8/1983 | Kummer et al. | 429/417 |
| 5,250,158 A | 10/1993 | Kaneko et al. | |
| 5,298,343 A | 3/1994 | Savadogo et al. | |
| 5,660,940 A | 8/1997 | Larsson et al. | |
| 5,683,829 A | 11/1997 | Sarangapani | |
| 5,958,616 A | 9/1999 | Salinas et al. | |
| 6,054,580 A | 4/2000 | Collins et al. | |
| 2001/0028977 A1 | 10/2001 | Kazacos et al. | |
| 2003/0152823 A1 | 8/2003 | Heller | |
| 2004/0028203 A1 | 2/2004 | Wurster et al. | |
| 2004/0028992 A1 | 2/2004 | Jaouen | |
| 2004/0137297 A1 | 7/2004 | Matsuoka et al. | |
| 2005/0074653 A1 | 4/2005 | Broman | |
| 2005/0112055 A1 | 5/2005 | Shannon et al. | |
| 2005/0142438 A1* | 6/2005 | Johnson et al. | 429/111 |
| 2005/0158618 A1 | 7/2005 | Liberatore et al. | |
| 2005/0244707 A1 | 11/2005 | Skyllas-Kazacos et al. | |
| 2006/0012637 A1 | 1/2006 | Furukawa et al. | |
| 2006/0024539 A1* | 2/2006 | Dumesic et al. | 429/17 |
| 2006/0088750 A1 | 4/2006 | Nobuta | |
| 2006/0134493 A1 | 6/2006 | Yoshida et al. | |
| 2006/0216565 A1 | 9/2006 | Cooray et al. | |
| 2007/0078052 A1 | 4/2007 | Grinberg et al. | |
| 2007/0099067 A1* | 5/2007 | Malhotra | 429/42 |
| 2007/0122689 A1 | 5/2007 | Kubo et al. | |
| 2007/0131546 A1 | 6/2007 | Nomoto et al. | |
| 2008/0274385 A1 | 11/2008 | Creeth | |
| 2009/0308752 A1 | 12/2009 | Evans et al. | |
| 2009/0317668 A1* | 12/2009 | Creeth et al. | 429/13 |
| 2009/0325002 A1 | 12/2009 | Creeth et al. | |
| 2010/0112388 A1 | 5/2010 | Creeth et al. | |
| 2010/0112393 A1 | 5/2010 | Creeth et al. | |
| 2011/0014532 A1 | 1/2011 | Knuckey et al. | |
| 2011/0027671 A1 | 2/2011 | Knuckey et al. | |
| 2011/0039170 A1 | 2/2011 | Creeth et al. | |
| 2011/0091746 A1 | 4/2011 | Knuckey et al. | |

FOREIGN PATENT DOCUMENTS

| | | |
|---|---|---|
| EP | 0 517 217 | 12/1992 |
| EP | 0 595 688 | 10/1993 |
| EP | 0 592 988 | 4/1994 |
| EP | 0 878 850 | 5/1998 |
| EP | 1 143 546 | 10/2001 |
| GB | 1 176 632 | 1/1970 |
| GB | 1 176 633 | 1/1970 |
| GB | 2 400 974 | 10/2004 |
| GB | 0505087.7 | 3/2005 |
| GB | 2 424 118 | 3/2006 |
| GB | 0605878.8 | 3/2006 |
| GB | 0608079.0 | 4/2006 |
| GB | 0614337.4 | 7/2006 |
| GB | 0614338.2 | 7/2006 |
| GB | 0718349.4 | 9/2007 |
| GB | 0718577.0 | 9/2007 |
| GB | 2 440 434 | 1/2008 |
| GB | 2 440 435 | 1/2008 |
| GB | 0801195.9 | 1/2008 |
| GB | 0801198.3 | 1/2008 |
| GB | 0801199.1 | 1/2008 |
| GB | 0907795.9 | 5/2009 |
| GB | 2 440 489 | 10/2009 |
| JP | 56 042970 | 4/1981 |
| JP | 61 054163 | 3/1986 |
| JP | 62 015770 | 1/1987 |
| JP | 05-295578 | 11/1993 |
| JP | 11-288727 | 10/1999 |
| JP | 2004 319292 | 11/2004 |
| RU | 2004129396 | 3/2006 |
| WO | WO 91/13681 | 9/1991 |
| WO | WO 96/31912 | 10/1996 |
| WO | WO 00/12667 | 3/2000 |
| WO | WO 00/22688 | 4/2000 |
| WO | WO 00/29537 | 5/2000 |
| WO | WO 01/73881 | 10/2001 |
| WO | WO 03/083967 | 10/2003 |
| WO | WO 2005/112055 | 11/2005 |
| WO | WO 2006/012637 | 2/2006 |
| WO | WO 2006/057387 | 6/2006 |
| WO | WO 2006/097438 | 9/2006 |
| WO | WO 2006/121191 | 11/2006 |
| WO | WO 2007/101284 | 9/2007 |
| WO | WO 2007/110663 | 10/2007 |
| WO | WO 2008/009992 | 10/2007 |
| WO | WO 2007/122431 | 11/2007 |
| WO | WO 2008/009993 | 1/2008 |
| WO | WO 2009/037513 | 3/2009 |
| WO | WO 2009/040577 | 4/2009 |
| WO | WO 2009/093080 | 7/2009 |
| WO | WO 2009/093081 | 7/2009 |
| WO | WO 2009/093082 | 7/2009 |
| WO | WO 2010/128333 | 11/2010 |

OTHER PUBLICATIONS

I. Bernal et al., "Iron(II) Complexes of Polydentate Aminopyridyl Ligands and an Exchangeable Sixth Ligand: Reactions with peroxides . . . " J. Chem. Soc., Dalton. Trans., 1995, 3667-3675.

J. Chang, et al., "Synthesis and Characterization of Bis(d-2-pyridylmethanamine)ruthenium(II)," Inorg. Chem. 2004, 43, 1735-1742.

R. Dillon, S. Sriinivasan, A.S. Arico, V. Antonucci, "International Activities in DMFC R&D: status of technologies and potential applications," J. Power Sources, 127, 2004, 112-126.

W. R. Harris et al., "Chelating Tendencies of Pyridyl-Containing Polyamines and Oxygenation of the Cobaltous Complexes." Inorg. Chem., 1978, 17, 889-894.

A. Heinzel, V.M. Barragan, "A review of the state-of-the-art of the methanol crossover in direct methanol fuel cells," J. Power Sources, 84, 1999, 70-74.

M.P. Hogarth, T.R. Ralph, "Catalysis for Low Temperature Fuel Cells," Platinum Metal Reviews, 46, 2002, 146-164.

M. Klopstra, R. Hage, R.M. Kellogg and B.L. Feringa, "Non-heme iron catalysts for the benzylic oxidation: a parallel ligand screening approach," Tet. Lett. 44, 2003; 4581-4584.

G.R. Knox and P.L. Pauson, "Ferrocene Derivatives, Part VII. Some Sulphur derivatives," J. Chem. Soc., 1958, 682.

Limoges, B.R. et al. "Electrocatalyst materials for fuel cells based on the polyoxometalates [PMo(12-n) Vn040]<(3+n)->(n=0-3)", Electrochimica Acta, Elsevier Scient Publishers, Barking, GB, vol. 50, No. 5, Jan. 15, 2005pp. 1169, 1170, 1176-1179.

M. Lubben et al., "Nonheme Iron Centers in Oxygen Activation: Characterization of an Iron(III) Hydroperoxide Intermediate," Angew. Chem. Int. Ed. Engl., 34, 1995, 1512-1514.

D. L. Reger et al., "Synthesis and structural characterization of the bitopic ferrocene-based tris(pyrazolyl)methane ligand Fe[C5H4CH2OCH2C(pz)3]2 (pz=pyrazolyl ring)" J. Chem. Crystallography, 35, 2005, 217-225.

H. Sato et al., "Convenient Synthesis of N,N,N',N'⁻ Tetrakis(2-pyridylmethyl)-α,ω-alkanediamines Using a Phase-Transfer Catalyst," Synthesis, 1992, 539-540.

M. Tamura et al., "Superoxide Dismutase Activity of Iron(II) TPEN complex and Its Derivatives," Chem. Pharm. Bull., 48, 2000, 1514-1518.

M. Van den Heuval et al., "Synthesis of a Non-Heme Template for Attaching Four Peptides: An Approach to Artificial Iron(II)-Containing Peroxidases," J. Organ. Chem., 69, 2004. 250-262.

V. Neburchilov, J. Martin, H. Wang, J. Zhang, "A Review of Polymer Electrolyte Membranes for Direct Methanol Fuel Cells," Journal of Power Sources, 2007, vol. 169, pp. 221-238.

J.G. Roelfes, "Models for Non-Heme Iron Containing Oxidation Enzymes," Jun. 4, 1972, pp. 1-154.

* cited by examiner

REDOX FUEL CELL

CROSS-REFERENCE TO RELATED APPLICATIONS

This Application is the US National Phase under 35 U.S.C. §371 of International Application No. PCT/GB2008/050857, filed Sep. 24, 2008, which was published in English as International Publication No. WO 2009/040577 on Apr. 2, 2009, and claims the benefit of GB0718577.0, filed Sep. 24, 2007.

BACKGROUND

1. Field

The present invention relates to fuel cells, in particular to indirect or redox fuel cells which have applications in micro-fuel cells for electronic and portable electronic components, and also in larger fuel cells for the automotive industry and for stationary and other portable applications. The invention also relates to certain catholyte solutions for use in such fuel cells.

2. Description of the Related Art

Fuel cells have been known for portable applications such as automotive and portable electronics technology and stationary applications such as back-up to and uninterruptible power for very many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, and air or oxygen as oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidized form for fuel) of a redox couple to oxidise it, and this oxidised species is fed to the cathode.

There are several types of fuel cell characterized by their different electrolytes. The liquid electrolyte alkali electrolyte fuel cells have inherent disadvantages in that the electrolyte dissolves $CO_2$ and needs to be replaced periodically. Polymer electrolyte or PEM-type cells with proton-conducting solid cell membranes are acidic and avoid this problem. However, it has proved difficult in practice to attain power outputs from such systems approaching the theoretical maximum level, due to the relatively poor electrocatalysts of the oxygen reduction reaction. In addition, expensive noble metal electrocatalysts are often used.

U.S. Pat. No. 3,152,013 discloses a gaseous fuel cell comprising a cation-selective permeable membrane, a gas permeable catalytic electrode and a second electrode, with the membrane being positioned between the electrodes and in electrical contact only with the gas permeable electrode. An aqueous catholyte is provided in contact with the second electrode and the membrane, the catholyte including an oxidant couple therein. Means are provided for supplying a fuel gas to the permeable electrode, and for supplying a gaseous oxidant to the catholyte for oxidising reduced oxidant material. The preferred catholyte and redox couple is HBr/KBr/$Br_2$. Nitrogen oxide is disclosed as a preferred catalyst for oxygen reduction, but with the consequence that pure oxygen was required as oxidant, the use of air as oxidant requiring the venting of noxious nitrogen oxide species.

US 2006/0024539 discloses a reactor and corresponding method for producing electrical energy using a fuel cell by selectively oxidising CO at room temperature using polyoxometallate compounds.

Polyoxometallate redox couples are also disclosed in WO 2007/110663. An acknowledged problem concerning electrochemical fuel cells is that the theoretical potential of a given electrode reaction under defined conditions can be calculated but never completely attained. Imperfections in the system inevitably result in a loss of potential to some level below the theoretical potential attainable from any given reaction. Previous attempts to reduce such imperfections include the selection of catholyte additives which undergo oxidation-reduction reactions in the catholyte solution. For example, U.S. Pat. No. 3,294,588 discloses the use of quinones and dyes in this capacity. Another redox couple which has been tried is the vanadate/vanadyl couple, as disclosed in U.S. Pat. No. 3,279,949.

According to U.S. Pat. No. 3,540,933, certain advantages could be realised in electrochemical fuel cells by using the same electrolyte solution as both catholyte and anolyte. This document discloses the use of a liquid electrolyte containing more than two redox couples therein, with equilibrium potentials not more than 0.8V apart from any other redox couple in the electrolyte.

The matching of the redox potentials of different redox couples in the electrolyte solution is also considered in U.S. Pat. No. 3,360,401, which concerns the use of an intermediate electron transfer species to increase the rate of flow of electrical energy from a fuel cell.

Several types of proton exchange membrane fuel cells exist. For example, in U.S. Pat. No. 4,396,687 a fuel cell is disclosed which comprises regenerable anolyte and catholyte solutions. The anolyte solution is one which is reduced from an oxidised state to a reduced state by exposure of the anolyte solution to hydrogen. According to U.S. Pat. No. 4,396,687, preferred anolyte solutions are tungstosilicic acid ($H_4SiW_{12}O_{40}$) or tungstophosphoric acid ($H_3PW_{12}O_{40}$) in the presence of a catalyst.

The preferred catholyte solution of U.S. Pat. No. 4,396,687 is one which is re-oxidised from a reduced state to an oxidized state by direct exposure of the catholyte solution to oxygen. The catholyte of U.S. Pat. No. 4,396,687 includes a mediator component comprising a solution of $VOSO_4$. The mediator functions as an electron sink which is reduced from an oxidation state of V(v) to V(IV). The catholyte also includes a catalyst for regenerating the mediator to its oxidised state, $(VO_2)_2SO_4$. The catalyst present in the catholyte of U.S. Pat. No. 4,396,687 is a polyoxometallate (POM) solution, namely $H_5PMo_{12}V_2O_{40}$.

Besides U.S. Pat. No. 4,396,687, a number of other attempts to use oxometallate catalysts have been made. For example, in U.S. Pat. No. 5,298,343, cathode systems comprising solid metal catalysts, oxometallates and metallic acids, such as molybdic acid are disclosed.

In addition, WO 96/31912 describes the use of embedded polyoxometallates in an electrical storage device. The redox nature of the polyoxometallate is employed in conjunction with carbon electrode material to temporarily store electrons. US 2005/0112055 discloses the use of polyoxometallates for catalysing the electrochemical generation of oxygen from water. GB 1176633 discloses a solid molybdenum oxide anode catalyst.

US 2006/0024539 discloses a reactor and a corresponding method for producing electrical energy using a fuel cell by selectively oxidising CO at room temperature using polyoxometallate compounds and transition metal compounds over metal-containing catalysts.

EP-A-0228168 discloses activated carbon electrodes which are said to have improved charge storage capacity due to the adsorption of polyoxometallate compounds onto the activated carbon.

Prior art fuel cells all suffer from one or more of the following disadvantages:

They are inefficient; they are expensive and/or expensive to assemble; they use expensive and/or environmentally unfriendly materials; they yield inadequate and/or insufficiently maintainable current densities and/or cell potentials; they are too large in their construction; they operate at too high a temperature; they produce unwanted by-products and/or pollutants and/or noxious materials; they have not found practical, commercial utility in portable applications such as automotive and portable electronics.

SUMMARY

Our co-pending application PCT/GB2007/050151 describes polyoxometallates as the basis for an efficient catholyte solution for the cathode of a redox fuel cell.

At higher currents, the power output of a fuel cell depends strongly on the resistance of the cell. Indeed the slope of the current/voltage curve is a measure of the resistance. The resistance of the membrane, electrode and contacts all can play a role.

For the indirect redox cathode, the conductivity of the solution can also be important.

One set of preferred polyoxometallates (POM) from our aforementioned copending application, $H_3Na_xPMo_{12-x}V_xO_{40}$ where x varies from 2-4, contains sodium ions and protons as counterions to the polyoxometallate. POM solutions contain large highly charged anionic species, together with the associated counterions. A fraction of the counterions are associated with the anions to reduce the net charge.

To increase the conductivity of the solution a small ion salt can be added, such as sodium sulphate or sulphuric acid. However, increasing the conductivity of polyoxometallate systems in this way is problematic: increasing the sodium content will increase the relative sodium/proton content in solution which will increase the sodium content in the membrane, and thus membrane resistance. Increasing the proton content increases both solution and membrane conductivity. However it has been found that the decrease in pH leads to poorer regeneration of the POM.

To reduce the membrane resistance, the balance of protons and other counterions present in solution needs to be shifted in favour of protons. The ion content of the membrane is dependent on the ion exchange with species in solution, thus the relative solution content of the ions present.

It is an object of the present invention to overcome or ameliorate one or more of the aforesaid disadvantages. It is a further object of the present invention to provide an improved catholyte solution for use in redox fuel cells. It is a further object of the invention to improve the cell performance of an indirect redox cathode system using a POM catalyst by decreasing the membrane resistance by increasing the solution proton content relative to the other ionic species present.

Accordingly, the present invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a catholyte solution comprising at least one non-volatile catholyte component flowing in fluid communication with the cathode, the catholyte solution comprising a polyoxometallate redox couple being at least partially reduced at the cathode in operation of the cell, and at least partially regenerated by reaction with the oxidant after such reduction at the cathode, the catholyte solution comprising at least one counterion for the polyoxometallate redox couple wherein the at least one counterion comprises a divalent ion.

The or each divalent ion is preferably selected from Ca, Mg, Mn, Fe, Co, Ni, Cu, Zn, Sr, Ba, Be, Cr, Cd, Hg, Sn, and other suitable ions from the 2nd and 3rd transition metal series or from the lanthanides, or from combinations of two or more thereof; more preferably from Ca, Mg, Mn, Fe, Co, Ni, Cu, Zn, or from combinations of two or more thereof.

We have found that a surprising improvement in cell performance can be realised with respect to the disclosure of our co-pending application PCT/GB2007/050151, in which the preferred polyoxometallate counterions are exemplified as hydrogen and sodium, by at least partially replacing those counterions with a divalent ion such as calcium. Calcium and other divalent ions are thought to have a greater affinity for ion exchange membranes than protons and/or sodium ions and it might be thought that their presence would therefore have a negative effect on cell conductivity. However, without wishing to be limited by theory, we believe that calcium and other divalent ions may also associate more strongly than protons and/or sodium ions with the polyoxometallate anion, giving a higher ratio of protons/other cations free in solution, thus improving the overall fuel cell performance by decreasing the resistance of the membrane.

Also provided in accordance with the invention is a catholyte solution for use in such a redox fuel cell, the solution comprising a polyoxometallate at least one counterion for the polyoxometallate wherein the at least one counterion comprises a divalent ion. The or each divalent ion is preferably selected from Ca, Mg, Mn, Fe, Co, Ni, Cu, Zn, Sr, Ba, Be, Cr, Cd, Hg, Sn, and other suitable ions from the 2nd and 3rd transition metal series or from the lanthanides, or from combinations of two or more thereof; more preferably from Ca, Mg, Mn, Fe, Co, Ni, Cu, Zn, or from combinations of two or more thereof.

Preferably the catholyte solution is about 0.075M polyoxometallate.

The polyoxometallate and associated counterion may be represented by the formula:

$$X_a[Z_bM_cO_d]$$

wherein:

X is selected from hydrogen, alkali metals, alkaline earth metals, ammonium, transition metal ions, and combinations of two or more thereof, but wherein at least one X is a divalent ion;

Z is selected from B, P, S, As, Si, Ge, Ni, Rh, Sn, Al, Cu, I, Br, F, Fe, Co, Cr, Zn, $H_2$, Te, Mn, and Se, and combinations of two or more thereof;

M is a metal selected from Mo, W, V, Nb, Ta, Mn, Fe, Co, Cr, Ni, Zn, Rh, Ru, Tl, Al, Ga, In, and other metals selected from the 1st, 2nd, and 3rd transition metal series, and the lanthanide series, and combinations of two or more thereof;

a is a number of X necessary to charge balance the $[M_cO_d]$ anion;

b is from 0 to 20;

c is from 1 to 40; and d is from 1 to 180.

At least one X is preferably selected from Ca Mg, Mn, Fe, Co, Ni, Cu, Zn, Sr Ba, Be, Cr, Cd, Hg, Sn and other suitable ions from the 2nd and 3rd transition series or from the lanthanides, or from combinations of two or more thereof; more preferably from Ca Mg, Mn, Fe, Co, Ni, Cu, Zn, or from combinations of two or more thereof.

Preferred ranges for b are from 0 to 15, more preferably 0 to 10, still more preferably 0 to 5, even more preferably 0 to 3, and most preferably 0 to 2.

Preferred ranges for c are from 5 to 20, more preferably from 10 to 18, most preferably 12.

Preferred ranges for d are from 30 to 70, more preferably 34 to 62, most preferably 34 to 40.

Vanadium and molybdenum, and combinations thereof, are particularly preferred for M Phosphorus is particularly preferred for Z.

A combination of hydrogen and an alkali metal and/or alkaline earth metal is particularly preferred for X, provided that at least one X is one or more divalent ions. One such preferred combination is hydrogen and sodium with one or more divalent ions. In each case the or each divalent ion is preferably selected from Ca, Mg, Mn, Fe, Co, Ni, Cu, Zn, Sr, Ba, Be, Cr, Cd, Hg, Sn, and other suitable ions from the 2nd and 3rd transition metal series or from the lanthanides, or from combinations of two or more thereof; more preferably from Ca, Mg, Mn, Fe, Co, Ni, Cu, Zn, or from combinations of two or more thereof.

Specific examples of polyoxometallates include molybdophosphoric acid, $H_3PMo_{12}O_{40}$ and molybdovanadophosphoric acid, $H_5PMo_{10}V_2O_{40}$, wherein the protons are at least partially replaced by one or more divalent ions, preferably selected from Ca, Mg, Mn, Fe, Co, Ni, Cu, Zn, Sr, Ba, Be, Cr, Cd, Hg, Sn, and other suitable ions from the 2nd and 3rd transition metal series or from the lanthanides, or from combinations of two or more thereof; more preferably from Ca, Mg, Mn, Fe, Co, Ni, Cu, Zn, or from combinations of two or more thereof.

In a preferred embodiment of the present invention, the polyoxometallate comprises vanadium, more preferably vanadium and molybdenum. Preferably the polyoxometallate comprises from 2 to 4 vanadium centres. Thus, particularly preferred polyoxometallates include $H_3Na_2PMo_{10}V_2O_{40}$, $H_3Na_3PMo_9V_3O_{40}$, or $H_3Na_4PMo_8V_4O_{40}$, wherein sodium ions are at least partially replaced by one or more divalent ions, and compounds of intermediate composition. In addition, a mixture of these or other polyoxometallate catalysts is also envisaged. For this embodiment, preferably, at least one X is hydrogen. However, it is also preferred that not all X be hydrogen. More preferably, at least two of X are not hydrogen. X comprising at least one hydrogen and at least one other material selected from alkali metals, alkaline earth metals, ammonium and combinations of two or more thereof is preferred, provided that at least one X is one or more divalent ions, preferably selected from Ca, Mg, Mn, Fe, Co, Ni, Cu, Zn, Sr, Ba, Be, Cr, Cd, Hg, Sn, and other suitable ions from the 2nd and 3rd transition metal series or from the lanthanides, or from combinations of two or more thereof; more preferably from Ca, Mg, Mn, Fe, Co, Ni, Cu, Zn, or from combinations of two or more thereof.

The concentration of the polyoxometallate in the catholyte solution is preferably at least about 0.08M, more preferably at least about 0.1M, still more preferably at least about 0.125M and most preferably at least about 0.15M.

In one preferred embodiment of the invention, the ion selective PEM is a cation selective membrane which is selective in favour of protons versus other cations.

The cation selective polymer electrolyte membrane may be formed from any suitable material, but preferably comprises a polymeric substrate having cation exchange capability.

Suitable examples include fluororesin-type ion exchange resins and non-fluororesin-type ion exchange resins. Fluororesin-type ion exchange resins include perfluorocarboxylic acid resins, perfluorosulfonic acid resins, and the like. Perfluorocarboxylic acid resins are preferred, for example "Nafion" (Du Pont Inc.), "Flemion" (Asahi Gas Ltd), "Aciplex" (Asahi Kasei Inc), and the like. Non-fluororesin-type ion exchange resins include polyvinyl alcohols, polyalkylene oxides, styrene-divinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytrifluorostyrene sulphonic, sulphonated trifluorostyrene, sulphonated copolymers based on $\alpha,\beta,\beta$-trifluorostyrene monomer, radiation-grafted membranes. Non-fluorinated membranes include sulphonated is poly(phenylquinoxalines), poly (2,6 diphenyl-4-phenylene oxide), poly(arylether sulphone), poly(2,6-diphenylenol); acid-doped polybenzimidazole, sulphonated polyimides; styrene/ethylene-butadiene/styrene triblock copolymers; partially sulphonated polyarylene ether sulphone; partially sulphonated polyether ether ketone (PEEK); and polybenzyl suphonic acid siloxane (PBSS).

In some cases it may be desirable for the ion selective polymer electrolyte membrane to comprise a bi-membrane. The bimembrane if present will generally comprise a first cation selective membrane and a second anion selective membrane. In this case the bimembrane may comprise an adjacent pairing of oppositely charge selective membranes. For example the bi-membrane may comprise at least two discreet membranes which may be placed side-by-side with an optional gap therebetween. Preferably the size of the gap, if any, is kept to a minimum in the redox cell of the invention. The use of a bi-membrane may be used in the redox fuel cell of the invention to maximise the potential of the cell, by maintaining the potential due to a pH drop between the anode and catholyte solution. Without being limited by theory, in order for this potential to be maintained in the membrane system, at some point in the system, protons must be the dominant charge transfer to vehicle. A single cation-selective membrane may not achieve this to the same extent due to the free movement of other cations from the catholyte solution In the membrane.

In this case the cation selective membrane may be positioned on the cathode side of the bimembrane and the anion selective membrane may be positioned on the anode side of the bimembrane. In this case, the cation selective membrane is adapted to allow protons to pass through the membrane from the anode side to the cathode side thereof in operation of the cell. The anion selective membrane is adapted substantially to prevent cationic materials from passing therethrough from the cathode side to the anode side thereof, although in this case anionic materials may pass from the cathode side of the anionic-selective membrane to the anode side thereof, whereupon they may combine with protons passing through the membrane in the opposite direction. Preferably the anion selective membrane is selective for hydroxyl ions, and combination with protons therefore yields water as product.

In a second embodiment of the invention the cation selective membrane is positioned on the anode side of the bimembrane and the anion selective membrane is positioned on the cathode side of the bi-membrane. In this case, the cation selective membrane is adapted to allow protons to pass through the membrane from the anode side to the cathode side thereof in operation of the cell. In this case, anions can pass from the cathode side into the interstitial space of the bimembrane, and protons will pass from the anode side. It may be desirable in this case to provide means for flushing such protons and anionic materials from the interstitial space of the bimembrane. Such means may comprises one or more perforations in the cation selective membrane, allowing such flushing directly through the membrane. Alternatively means may be provided for channelling flushed materials around the cation selective membrane from the interstitial space to the cathode side of the said membrane.

According to another aspect of the present invention, there is provided a method of operating a proton exchange membrane fuel cell comprising the steps of:

a) forming $H^+$ ions at an anode situated adjacent to a proton exchange membrane;

b) supplying the catholyte of the invention with its redox couple in an oxidised state to a cathode situated oppositely adjacent to the proton exchange membrane; and c) allowing the catalyst to become reduced upon contact with the cathode concomitantly with $H^+$ ions passing through the membrane to balance charge.

In a preferred embodiment, the catholyte is supplied from a catholyte reservoir.

The method of the above fourth aspect may additionally comprise the step of:

d) passing the catholyte from the cathode to a reoxidation zone wherein the catalyst is reoxidised.

In an especially preferred embodiment, the method of the above aspect comprises the step of:

e) passing the catholyte from the reoxidation zone to the catholyte reservoir.

In this embodiment, the cell is cyclic and the catalyst in the cathode can be repeatedly oxidised and reduced without having to be replaced.

The fuel cell of the invention may comprise a reformer configured to convert available fuel precursor such as LPG, LNG, gasoline or low molecular weight alcohols into a fuel gas (e.g. hydrogen) through a steam reforming reaction. The cell may then comprise a fuel gas supply device configured to supply the reformed fuel gas to the anode chamber It may be desirable in certain applications of the cell to provide a fuel humidifier configured to humidify the fuel, e.g. hydrogen. The cell may then comprise a fuel supply device configured to supply the humidified fuel to the anode chamber.

An electricity loading device configured to load an electric power may also be provided in association with the fuel cell of the invention.

Preferred fuels include hydrogen; metal hydrides (for example borohydride which may act as a fuel itself or as a provider of hydrogen), ammonia, low molecular weight alcohols, aldehydes and carboxylic acids, sugars and biofuels as well as LPGLNG or gasoline.

Preferred oxidants include air, oxygen and peroxides

The anode in the redox fuel cell of the invention may for example be a hydrogen gas anode or a direct methanol anode; other low molecular weight alcohols such as ethanol, propanol, dipropylene glycol; ethylene glycol; also aldehydes formed from these and acid species such as formic acid, ethanoic acid etc. In addition the anode may be formed from a bio-fuel cell type system where a bacterial species consumes a fuel and either produces a mediator which is oxidized at the electrode, or the bacteria themselves are adsorbed at the electrode and directly donate electrons to the anode.

The cathode in the redox fuel cell of the invention may comprise as cathodic material carbon, gold, platinum, nickel, metal oxide species. However, it is preferable that expensive cathodic materials are avoided, and therefore preferred cathodic materials include carbon, nickel and metal oxide. One preferable material for the cathodes is reticulated vitreous carbon or carbon fibre based electrodes such as carbon felt. Another is nickel foam. The cathodic material may be constructed from a fine dispersion of particulate cathodic material, the particulate dispersion being held together by a suitable adhesive, or by a proton conducting polymeric material. The cathode is to designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

The redox couple flowing in solution in the cathode chamber in operation of the cell is used in the invention as a catalyst for the reduction of oxygen in the cathode chamber, in accordance with the following (wherein Sp is the redox couple species).

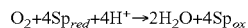

$$O_2 + 4Sp_{red} + 4H^+ \rightarrow 2H_2O + 4Sp_{ox}$$

The polyoxometallate redox couple, and any other ancillary redox couple, utilised in the fuel cell of the invention should be non-volatile, and is preferably soluble in aqueous solvent. Preferred redox couples should react with the oxidant at a rate effective to generate a useful current in the electrical circuit of the fuel cell, and react with the oxidant such that water is the ultimate end product of the reaction.

The fuel cell of the invention requires the presence of at least about 0.1 M of a polyoxometallate species in the catholyte solution. However, in some circumstances it may also be possible to include other redox couples in the catholyte solution in addition to the polyoxometallate species. There are many suitable examples of such ancillary redox couples, including ligated transition metal complexes and other polyoxometallate species. Specific examples of suitable transition metals ions which can form such complexes include manganese in oxidation states II-V, Iron I-IV, copper I-III, cobalt I-III, nickel I-III, chromium (II-VII), titanium II-IV, tungsten IV-VI, vanadium II-V and molybdenum II-VI. Ligands can contain carbon, hydrogen, oxygen, nitrogen, sulphur, halides, phosphorus. Ligands may be chelating complexes include Fe/EDTA and Mn/EDTA, NTA, 2-hydroxyethylenediaminetriacetic acid, or non-chelating such as cyanide.

In some cases, it may be preferable however to avoid the presence in the catholyte solution of the invention of any mediator, and to rely on the redox behaviour of the polyoxometallate material(s) alone.

The fuel cell of the invention may operate straightforwardly with a redox couple catalysing in operation of the fuel cell the reduction of oxidant in the cathode chamber. However, in some cases, and with some redox couples, it may be necessary and/or desirable to incorporate a catalytic mediator in the cathode chamber.

BRIEF DESCRIPTION OF THE DRAWINGS

Various aspects of the present invention will now be more particularly described with reference to the following figures which illustrate embodiments of the present invention.

DETAILED DESCRIPTION

Figure 1:
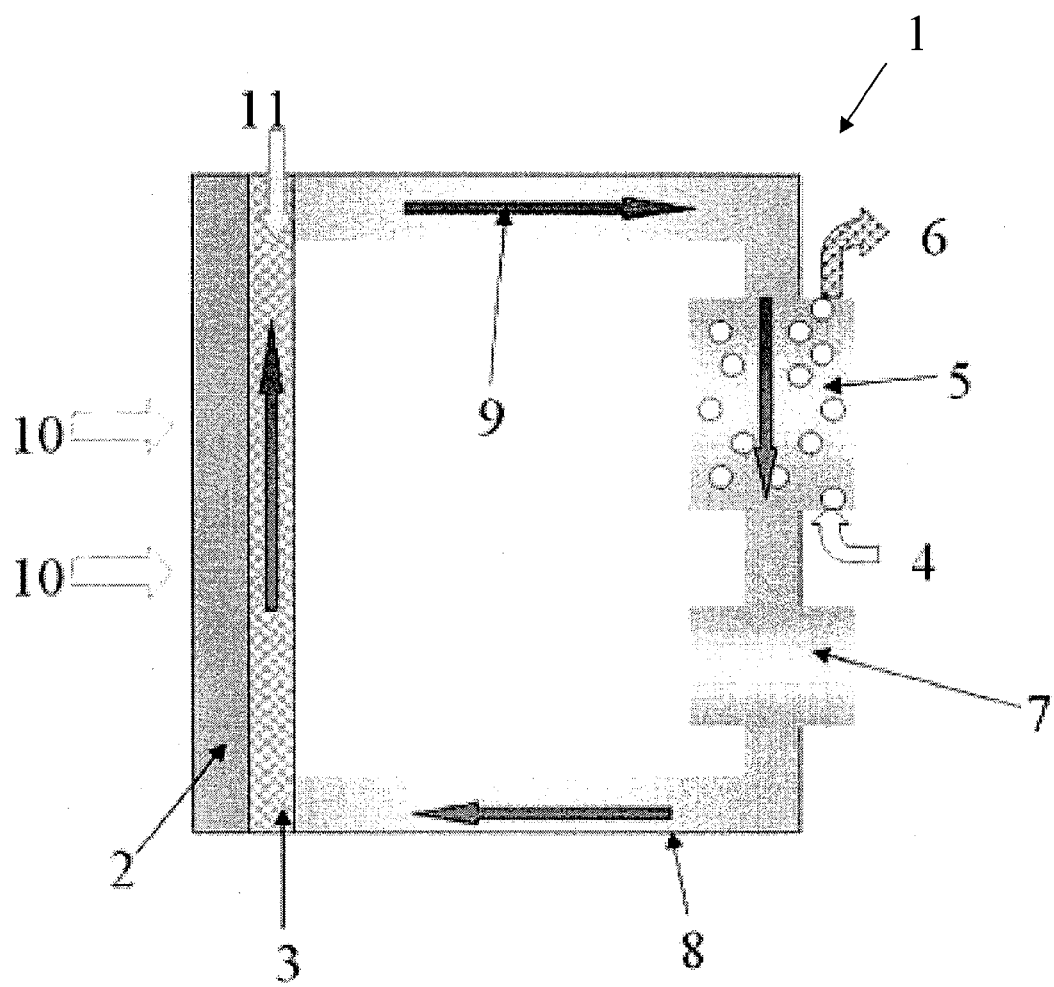
FIG. 1 illustrates a schematic view of the cathode compartment of a fuel cell in accordance with the present invention.

Referring to FIG. 1, there is shown the cathode side of fuel cell 1 in accordance with the invention comprising a polymer electrolyte membrane 2 separating an anode (not shown) from cathode 3. Cathode 3 comprises in this diagram reticulated carbon and is therefore porous. However, other cathodic materials such as platinum may be used. Polymer electrolyte membrane 2 comprises cation selective Nafion 112 membrane through which protons generated by the (optionally catalytic) oxidation of fuel (in this case hydrogen) in the anode chamber pass in operation of the cell. Electrons generated at the anode by the oxidation of fuel gas flow in an electrical circuit (not shown) and are returned to cathode 3. Fuel gas (in this case hydrogen) is supplied to the fuel gas passage of the anode chamber (not shown), while the oxidant (in this case air) is supplied to oxidant inlet 4 of cathode gas reaction chamber 5. Cathode gas reaction chamber 5 (the catalyst reoxidation zone) is provided with exhaust 6, through which the by-products of the fuel cell reaction (e.g. water and heat) can be discharged.

A catholyte solution comprising the oxidised form of the polyoxometallate redox catalyst is supplied in operation of the cell from catholyte reservoir 7 into the cathode inlet channel 8. The catholyte passes into reticulated carbon cathode 3, which is situated adjacent membrane 2. As the catholyte passes through cathode 3, the polyoxometallate catalyst is reduced and is then is returned to cathode gas reaction chamber 5 via cathode outlet channel 9.

Due to the advantageous composition of the catholyte of the present invention, reoxidation of the catalyst occurs very rapidly, which allows the fuel cell to produce a higher sustainable current than with catholytes of the prior art.

A comparative test highlighting the projected improved performance of the catholyte of the present invention over the catholytes disclosed in our co-pending PCT/GB2007/050151 was performed as described in the following examples.

EXAMPLE 1

An experiment was conducted to examine the effect of adding either sodium or calcium ions to a steady state acidified polyoxometallate catholyte.

A fresh sample of 0.3 M $Na_4H_3PMo_8V_4O_{40}$ was subjected to five ion exchange processes using Dowex-50WX8 acidic resin. Titration of the resulting solution with NaOH gave results consistent with a molecular formula of $Na_{1.5}H_{5.5}PMo_8V_4O_{40}$. This solution was partially reduced in the fuel cell by drawing a current and a steady state equilibrium was reached by allowing the solution to regenerate through contact with air.

A 35 ml aliquot of the equilibrium mixture was subjected to the addition of known amounts of either calcium hydroxide or sodium hydroxide and the resulting solution pH and conductivity were measured. Data is presented in Table 1 for the addition of calcium hydroxide and Table 2 for the addition of sodium hydroxide.

TABLE 1

| Amount of $Ca(OH)_2$ added | | pH | | Conductivity | |
|---|---|---|---|---|---|
| $Ca^{2+}$/ | $OH^-$/ | Measurement | | Measurement | |
| mmoles | mmoles | pH | T/° C. | Conductivity/mScm$^{-1}$ | T/° C. |
| 0 | 0 | 0.22 | 23.3 | 106.5 | 23.1 |
| 2.5 | 5.0 | 0.39 | 24.7 | 84.2 | 24.5 |
| 5.0 | 10.0 | 0.62 | 25.5 | 64.8 | 25.3 |
| 7.5 | 15.0 | 0.97 | 25.7 | 48.9 | 25.5 |
| 10.0 | 20.0 | 1.44 | 26.3 | 42.5 | 26.0 |

TABLE 2

| Amount of NaOH added | | pH | | Conductivity | |
|---|---|---|---|---|---|
| $Na^+$/ | $OH^-$/ | Measurement | | Measurement | |
| mmoles | mmoles | pH | T/° C. | Conductivity/mScm$^{-1}$ | T/° C. |
| 0 | 0 | 0.23 | 24.9 | 108.1 | 24.5 |
| 5.0 | 5.0 | 0.44 | 26.5 | 86.8 | 26.1 |
| 10.0 | 10.0 | 0.69 | 27.6 | 67.1 | 27.0 |
| 15.0 | 15.0 | 1.12 | 28.1 | 52.8 | 27.8 |
| 20.0 | 20.0 | 1.54 | 28.4 | 48.7 | 28.0 |

The data presented shows that for the addition of an equivalent number of hydroxide ions, the pH is consistently lower when calcium hydroxide is used rather than sodium hydroxide, ie a higher free solution proton concentration is observed in the calcium case. As the conductivity of the solution is dominated by $H^+$ ions (see Table 3 for equivalent ionic conductivities of $H^+$, $Na^+$ and $Ca^{2+}$), the solution to with the lowest pH and therefore highest concentration of $H^+$ ions may be expected to display the highest conductivity. The opposite case is observed here, suggesting that $Ca^{2+}$ binds to the polyoxometallate more strongly than $Na^+$, thus generating a situation where there are fewer ions, other than protons, in the solution. This would be a favourable solution for use in the fuel cell to avoid contamination of the membrane.

TABLE 3

| Ion | Equivalent Ionic Conductivity, λ0/ cm2Ω-1equiv-1 |
|---|---|
| $H^+$ | 349.82 |
| $Na^+$ | 50.11 |
| ½ $Ca^{2+}$ | 59.50 |

Ionic Properties at Infinite Dilution in Aqueous Solution at 25° C. Taken from A. J. Bard & L. R. Faulkner, "Electrochemical Methods—Fundamentals and Applications", John Wiley & Sons, 1980, p. 67.

EXAMPLE 2

Synthesis of 200 mL of 0.3 M $H_6PMo_9V_3O_{40}$ (aq) and $CaH_4PMo_9V_3O_{40}$ (aq)

Adapted from the synthesis of $H_aP_zMo_yV_xO_b$ solutions by V. F. Odyakov, E. G. Zhizhina and R. I. Maksimovskaya in Applied Catalysis A: General, 2008, 342, 126-130.
Synthesis of $H_9PV_{14}O_{42}$ solution
Water (250 mL) was cooled in an ice bath to approximately 5° C. To this solution was added $V_2O_5$ (5.46 g, 0.030 moles) and a further amount of water (50 mL). The mixture was stirred and maintained at 5° C. whilst hydrogen peroxide (45 mL of 30% solution in water) was added. After stirring for 30 minutes and ensuring the temperature did not exceed 12° C., the solution had turned clear deep red in colour. To this solution was added 7.183 M $H_3PO_4$ (aq) (1.16 mL) which caused the solution to turn brown after 1 hour of stirring below 40° C.

Alongside the preparation of this solution, a repeat reaction was carried out on double the scale with 10.92 g $V_2O_5$ in 500 mL ultrapure water and adding 90 mL of 30% $H_2O_2$ (aq) and 2.32 mL of 7.183 M $H_3PO_4$(aq).

The sum of the vanadium content of these two solutions is 0.09 moles and both solutions were used in the next step to generate 200 mL 0.3 M $H_6PMo_9V_3O_{40}$.

Synthesis of $H_6PMo_9V_3O_{40}$ Solution

In a conical flask, $MoO_3$ (77.73 g, 0.54 moles) was suspended in water (750 mL) and stirred. 7.183 M $H_3PO_4$ (aq) (4.86 mL) was added and the resulting solution was heated to boiling whereupon it turned yellow. Approximately 200 mL of the pre-prepared vanadium solution from part (a) was added to the molybdenum solution and the mixture was heated, stirred and allowed to evaporate. Further 200 mL aliquots of the vanadium solution were added as evaporation took place until both of the pre-prepared solutions had been completely added. The resulting solution was then heated and evaporated to a volume of around 150 mL before transferring to a volumetric flask and making up to a final volume of 200 mL to give 0.3 M $H_6PMo_9V_3O_{40}$ solution.

Synthesis of $CaH_4PMo_9V_3O_{40}$ solution

In a conical flask, $H_6PMo_9V_3O_{40}$(aq) (200 ml, 0.06 moles) was heated (80° C.) and stirred. 4.444 g $Ca(OH)_2$ (S) (0.06 M) was added and the resulting solution was stirred until all the solid $Ca(OH)_2$ has dissolved.

EXAMPLE 3

Figure 2:
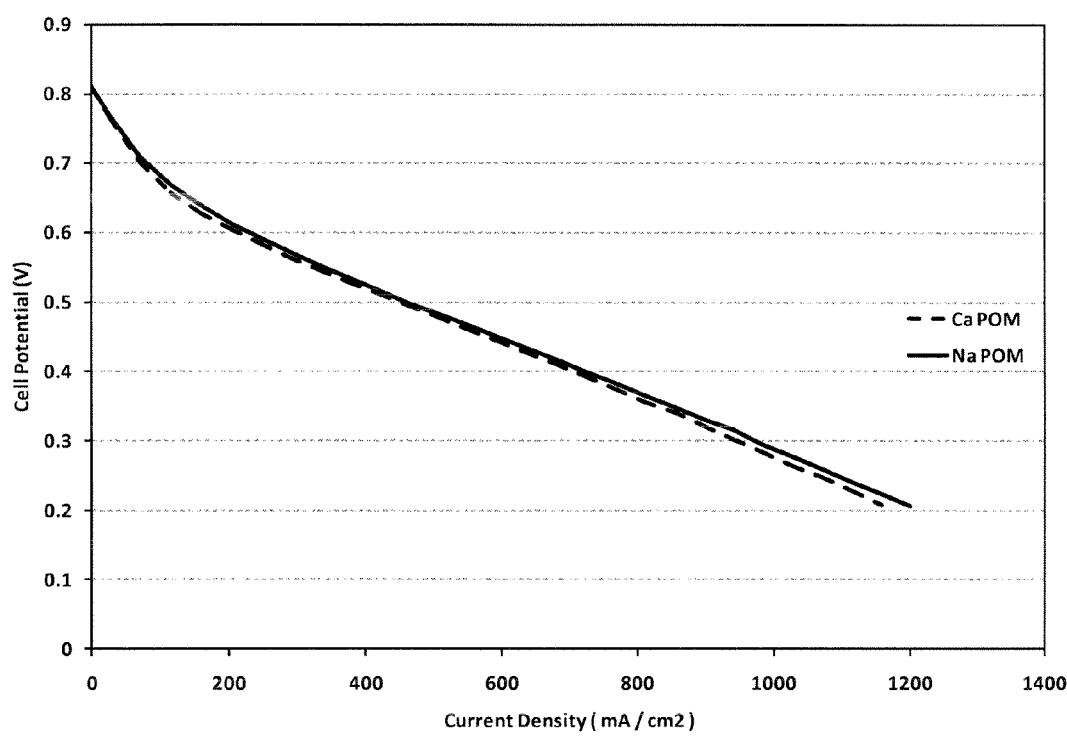
FIG. 2 illustrates graphically the cell polarisation curve of a 0.3M $CaH_4PMo_9V_3O_{40}$ polyoxometallate solution in accordance with the invention with that obtained for an identical cell using 0.3M $Na_3H_3PMo_9V_3O_{40}$ as a catholyte.

Fuel Cell Tests of Ca POM System 0.3M $CaH_4PMo_9V_3O_{40}$ polyoxometallate solution was prepared and installed in a fuel cell with flow-through cathode electrode. The cell had an active area of 48×48 mm, with a reticulated vitreous carbon electrode 2 mm deep. An ion-power NRE212 half-MEA was used, with an anode Pt loading of 0.3 mg cm$^{-2}$. An E-Tek 1400LT woven gas diffusion layer was used at the anode. The cell was operated with hydrogen at the anode and a cell operating temperature of 82° C. FIG. 2 compares the cell polarisation curve with that obtained for an identical cell using 0.3M $Na_3H_3PMo_9V_3O_{40}$ as a catholyte.

As can be seen, the fuel cell performance of the two catholyte systems is very similar. This indicates that the $Ca^{2+}$ counter-ions are not adversely affecting the Nafion membrane, as would be expected if $Ca^{2+}$ ions were dissociated from the main POM$^{6-}$ ion and free to enter the membrane structure. Surprisingly, it appears that the $Ca^{2+}$ must be preferentially bound to the negative POM ion.

This result demonstrates that a variety of 2+ charge metal counter ions could be used in conjunction with POM catholytes without risking contamination of the membrane.

The invention claimed is:

1. A redox fuel cell comprising:
    an anode region comprising an anode and a cathode region comprising a cathode, said regions being separated by an ion selective polymer electrolyte membrane;
    a fuel passage through which fuel is supplied to the anode region of the cell;
    an oxidant inlet that supplies an oxidant to the cathode region of the cell;
    an electrical circuit between the anode and the cathode; and
    a non-volatile catholyte solution flowing fluid communication with the cathode, the catholyte solution comprising a polyoxometallate being at least partially reduced at the cathode in operation of the cell, and at least partially re-generated by reaction with the oxidant after such reduction at the cathode, the catholyte solution further comprising at least one counterion for the polyoxometallate, wherein the at least one counterion comprises one or more divalent ions and the polyoxometallate of the catholyte solution is not present in the fuel.

2. A redox fuel cell according to claim 1 wherein the one or more divalent ions are selected from Ca, Mg, Mn, Fe, Co, Ni, Cu, Zn, Sr, Ba, Be, Cr, Cd, Hg, Sn, ions from the 2nd and 3rd transition metal series, from the lanthanides, and from combinations of two or more thereof.

3. A redox fuel cell according to claim 2 wherein the one or more divalent ions are selected from Mg, Ca, Mn, Fe, Co, Ni, Cu, and Zn, and from combinations of two or more thereof.

4. A redox fuel cell according to claim 1 wherein the polyoxometallate and associated counterion is represented by the formula:

$$X_a[Z_bM_cO_d]$$

wherein:
    X is selected from the group consisting of: hydrogen, alkali metals, alkaline earth metals, ammonium, transition metal ions and combinations of two or more thereof, wherein at least one X is a divalent ion,
    Z is selected from the group consisting of: B, P, S, As, Si, Ge, Ni, Rh, Sn, Al, Cu, I, Br, F, Fe, Co, Cr, Zn, $H_2$, Te, Mn, Se, and combinations of two or more thereof,
    M is a metal selected from the group consisting of: Mo, W, V, Nb, Ta, Mn, Fe, Co, Cr, Ni, Zn, Rh, Ru, Tl, Al, Ga, In, a metal selected from the 1st, 2nd, and 3rd transition metal series, a metal selected from the lanthanide series, and combinations of two or more thereof;
    a is a number of X necessary to charge balance the [$Z_bM_cO_d$] anion;
    b is from 0 to 20;
    c is from 1 to 40; and
    d is from 1 to 180.

5. A redox fuel cell according to claim 4 wherein the divalent ion is selected from Ca, Mg, Mn, Fe, Co, Ni, Cu, Zn, Sr, Ba, Be, Cr, Cd, Hg, Sn, ions from the 2nd and 3rd transition metal series, from the lanthanides, and from combinations of two or more thereof.

6. A redox fuel cell according to claim 5 wherein the divalent ion is selected from Ca, Mg, Mn, Fe, Co, Ni, Cu, Zn, and from combinations of two or more thereof.

7. A redox fuel cell according to claim 4 wherein b ranges from 0 to 2.

8. A redox fuel cell according to claim 4 wherein c ranges from 5 to 20.

9. A redox fuel cell according to claim 4 wherein d ranges from 30 to 70.

10. A redox fuel cell according to claim 4 wherein M is selected from the group consisting of: vanadium, molybdenum, and combinations thereof.

11. A redox fuel cell according to claim 4 wherein Z is phosphorus.

12. A redox fuel cell according to claim 4 wherein X comprises a combination of hydrogen and at least one of an alkali metal and an alkaline earth metal, wherein at least one X is a divalent ion.

13. A redox fuel cell according to claim 4 wherein at least one X is hydrogen.

14. A redox fuel cell according to claim 13 wherein X comprises at least one hydrogen and at least one other material selected from alkali metals, alkaline earth metals, ammonium, and combinations of two or more thereof, wherein at least one X is a divalent ion.

15. A redox fuel cell according to claim 1 comprising from 2 to 4 vanadium centres in the polyoxometallate.

16. A redox fuel cell according to claim 15 wherein the polyoxometallate comprises $H_3Na_2PMo_{10}V_2O_{40}$, wherein the protons and/or sodium ions are at least partially replaced by one or more divalent ions.

17. A redox fuel cell according to claim 15, wherein the polyoxometallate comprises $H_3Na_2PMo_9V_3O_{40}$, wherein the protons and/or sodium ions are at least partially replaced by one or more divalent ions.

18. A redox fuel cell according to claim 15 wherein the polyoxometallate comprises $H_3Na_4PMo_8V_4O_{40}$, wherein the protons and sodium ions are at least partially replaced by one or more divalent ions.

19. A redox fuel cell according to claim 1 wherein the catholyte solution comprises at least one ancillary redox species.

20. A redox fuel cell according to claim 19 wherein the ancillary redox species is selected from ligated transition metal complexes, further polyoxometallate species, and combinations thereof.

21. A redox fuel cell according to claim 20 wherein the transition metals in the transition metal complexes are selected from the group consisting of: manganese in oxidation states II-V, Iron I-IV, copper I-III, cobalt I-III, nickel I-III, chromium (II-VII), titanium II-IV, tungsten IV-VI, vanadium II-V and molybdenum II-VI.

22. A redox fuel cell according to claim 1 wherein the catholyte solution is substantially free from any ancillary redox species.

23. A redox fuel cell according to claim 1 wherein the concentration of the polyoxometallate in the catholyte solution is over 0.075M.

24. A catholyte solution for use in a redox fuel cell according to claim 1, the solution comprising a polyoxometallate and a counterion comprising one or more divalent ions.

25. A method of generating electricity by the redox fuel cell of claim 1, comprising:
   supplying fuel to the anode region;
   supplying oxidant to the cathode region; and
   generating electricity through the electrical circuit between the anode and the cathode.

* * * * *